United States Patent
Takatsuji et al.

(10) Patent No.: US 8,510,844 B2
(45) Date of Patent: Aug. 13, 2013

(54) AUTHORIZED CONTENT VERIFICATION METHOD, CONTENT TRANSMISSION/RECEPTION SYSTEM, TRANSMITTER, AND RECEIVER

(75) Inventors: Ayako Takatsuji, Osaka (JP); Hiroyuki Iitsuka, Osaka (JP); Naoshi Usuki, Kyoto (JP)

(73) Assignee: Panasonic Corporation, Osaka (JP)

( * ) Notice: Subject to any disclaimer, the term of this patent is extended or adjusted under 35 U.S.C. 154(b) by 621 days.

(21) Appl. No.: 11/577,115

(22) PCT Filed: Oct. 12, 2005

(86) PCT No.: PCT/JP2005/018777
§ 371 (c)(1),
(2), (4) Date: Apr. 12, 2007

(87) PCT Pub. No.: WO2006/041082
PCT Pub. Date: Apr. 20, 2006

(65) Prior Publication Data
US 2008/0244698 A1    Oct. 2, 2008

(30) Foreign Application Priority Data
Oct. 13, 2004 (JP) ................................. 2004-298722

(51) Int. Cl.
*G06F 7/04* (2006.01)
(52) U.S. Cl.
USPC ............. 726/26; 726/27; 726/30; 726/31; 713/170; 713/171; 713/175; 705/51; 705/57; 705/58; 705/59

(58) Field of Classification Search
None
See application file for complete search history.

(56) References Cited

U.S. PATENT DOCUMENTS

| 7,475,322 | B2 * | 1/2009 | Huntly-Playle et al. | 714/748 |
|---|---|---|---|---|
| 2002/0161718 | A1 * | 10/2002 | Coley et al. | 705/59 |
| 2003/0014372 | A1 * | 1/2003 | Wheeler et al. | 705/71 |
| 2003/0142824 | A1 * | 7/2003 | Asano et al. | 380/277 |

(Continued)

FOREIGN PATENT DOCUMENTS

| JP | 2001-358706 | 12/2001 |
|---|---|---|
| JP | 2002-207639 | 7/2002 |

OTHER PUBLICATIONS

International Search Report for application No. PCT/JP2005/018777 dated Jan. 17, 2006.

(Continued)

*Primary Examiner* — Ashok Patel
*Assistant Examiner* — Alexander Lagor
(74) *Attorney, Agent, or Firm* — RatnerPrestia

(57) ABSTRACT

In a system which attaches update information required to create a content key used for content encryption/decryption to encrypted content and transmits the encrypted content, there is used an authorized content verification method including a verification request step of, by a receiver, transmitting an authorization verification request including update information received from a transmitter, an update information check step of, by the transmitter, checking whether the update information included in the received authorization verification request is predetermined update information, a message-of-acceptance transmission step of creating a message of acceptance using the update information and an exchange key shared between the transmitter and the receiver and transmitting the message of acceptance if the update information matches the predetermined update information, and an authorized content determination step of, by the receiver, determining that content is authorized content on the basis of reception of the message of acceptance.

12 Claims, 11 Drawing Sheets

(56) References Cited

U.S. PATENT DOCUMENTS

2004/0047308 A1   3/2004  Kavanagh
2004/0133785 A1*  7/2004  Kugai .......................... 713/182
2005/0060542 A1*  3/2005  Risan et al. ................... 713/165

OTHER PUBLICATIONS

European Application Serial No. 05793204.8, Extended European Search Report dated Nov. 14, 2011, 5 pgs.

* cited by examiner

AUTHORIZED CONTENT VERIFICATION METHOD, CONTENT TRANSMISSION/RECEPTION SYSTEM, TRANSMITTER, AND RECEIVER

CROSS-REFERENCE TO RELATED APPLICATIONS

This application is a U.S. national phase application of PCT International Patent Application No. PCT/JP2005/ 18777, filed Oct. 12, 2005, claiming the benefit of priority of Japanese Patent Application No. 2004-298722 filed Oct. 13, 2004, all of which are incorporated by reference herein in their entirety.

TECHNICAL FIELD

The present invention relates to an authorized content verification method, content transmission and reception system, transmitter, receiver, and the like associated with a data transmission security technique for transmitting and receiving authorized content between a delivery source (transmitter) and a delivery destination (receiver) at the time of delivering content via a network.

BACKGROUND ART

In recent years, Internet access environments have been well developed, and environments which facilitate providing home electric appliances with connectivity to a network (e.g., the lower costs and improved capabilities of devices for networking) have been being developed. At the same time, there has been growing emphasis on copyright protection techniques for protecting content to be transmitted from unauthorized copying, unauthorized interception, and unauthorized tampering. Digital Transmission Content Protection (DTCP) was developed as a copyright protection technique for AV content to be transmitted over an IEEE1394 serial bus and has been deployed on the Internet Protocol (IP) as an extension of the technique (see DTCP Volume 1 Supplement E Mapping DTCP to IP (Informational Version), Revision 1.0, Nov. 24, 2003).

FIGS. 8 and 9 are an example of a functional block diagram of a transmitter and an example of a functional diagram of a receiver, respectively, in a conventional DTCP-IP-based transmission system using the HTTP protocol (under which a connection is established between a server and a client, and data is exchanged between them in the form of a request from the client and a response of the server to the request).

A transmitter 800 in FIG. 8 comprises a certificate and key holding unit 801, an exchange key creation unit 802, an authentication and key exchange unit 803, an update information creation and updating unit 804, a copy control information management unit 805, a content key calculation unit 806, a content accumulation unit 807, a content encryption unit 808, a content packet creation unit 809, a content packet transmission unit 810, and an HTTP protocol unit 811.

The certificate and key holding unit 801 holds a pair of keys (a public key and a private key) of a public key cryptosystem and a certificate.

The exchange key creation unit 802 generates an exchange key (Kx) used to calculate a content key (Kc) for content encryption.

The authentication and key exchange unit 803 accepts an authentication request from a receiver and verifies, through authentication, whether the receiver is an authorized device. In the authentication, a method for performing challenge-response authentication using pairs of keys (public keys and private keys) of the public key cryptosystem and certificates respectively held by the transmitter and receiver is used. During the authentication, an authentication key (Kauth) becomes shared between the transmitter and the receiver. After the authentication, an exchange key (Kx) created by the exchange key creation unit 802 is passed to the receiver using the shared authentication key (Kauth). The series of processes from authentication to key acquisition is performed by the authentication and key exchange unit 803.

The update information creation and updating unit 804 newly creates or updates update information (Nc). The creation refers to, e.g., creating new update information (Nc) by random number generation or the like, and the updating refers to, e.g., adding 1 to the current value of update information (Nc). Update information (Nc) is created upon establishment of a TCP connection. The updating is performed according to a predetermined rule. An example of the predetermined rule is to perform updating with each pair of an HTTP request and response over a single TCP connection. The rule is not the focus of the present invention, and an explanation thereof will be omitted. Update information (Nc) created or updated by the update information creation and updating unit 804 is used to calculate a content key (Kc) by a predetermined rule for maintenance of content protection. The update information (Nc) is attached to a content component encrypted with the content key (Kc) and passed to a receiver.

The copy control information management unit 805 manages an encryption mode used for content which indicates the details of management for the content (e.g., Copy Never or Copy Once) as copy control information (E_EMI). Copy control information (E_EMI) is used to calculate a content key (Kc), attached to a content component encrypted with the calculated content key (Kc), and passed to a receiver.

The content key calculation unit 806 calculates a content key (Kc) from an exchange key (Kx) created by the exchange key creation unit 802, update information (Nc) created or updated by the update information creation and updating unit 804, copy control information (E_EMI) managed by the copy control information management unit 805, and the like, using a one-way function.

The content accumulation unit 807 stores various types of content serving as objects to be delivered.

The content encryption unit 808 encrypts a content component to be delivered using a content key (Kc) calculated by the content key calculation unit 806.

The content packet creation unit 809 creates a content packet formed by attaching update information (Nc) created or updated by the update information creation and updating unit 804 and copy control information (E_EMI) managed by the copy control information management unit 805 to a content component encrypted by the content encryption unit 808.

The content packet transmission unit 810 transmits a content packet created by the content packet creation unit 809.

The HTTP protocol unit 811 performs HTTP server processing, i.e., receives and analyzes an HTTP request and creates and sends an HTTP response. A content packet created by the content packet creation unit 809 is transmitted as the body of an HTTP response to an HTTP GET request from the transmitter.

A receiver 900 in FIG. 9 comprises a certificate and key holding unit 901, an authentication and key exchange unit 902, an update information storage unit 903, a copy control information storage unit 904, a content key calculation unit 905, a content utilization unit 906, a content decryption unit 907, a content packet analysis unit 908, a content packet reception unit 909, and an HTTP protocol unit 910.

The certificate and key holding unit 901 holds a pair of keys (a public key and a private key) of the public key cryptosystem and a certificate.

The authentication and key exchange unit 902 makes an authentication request at a predetermined time. During authentication, an authentication key (Kauth) becomes shared between a transmitter and the receiver. After the authentication, the authentication and key exchange unit 902 receives an exchange key (Kx) encrypted using the shared authentication key (Kauth) from the transmitter and decrypts the exchange key (Kx).

The update information storage unit 903 stores update information (Nc) attached to an encrypted content component received from a transmitter.

The copy control information storage unit 904 stores copy control information (E_EMI) attached to an encrypted content component.

The content key calculation unit 905 calculates a content key (Kc) from an exchange key (Kx) in the authentication and key exchange unit 902 passed from a transmitter, update information (Nc) stored in the update information storage unit 903, copy control information (E_EMI) stored in the copy control information storage unit 904, and the like, using a one-way function.

The content utilization unit 906 utilizes a decrypted content component by, e.g., playing back or recording the content component according to copy control information (E_EMI) stored in the copy control information storage unit 904.

The content decryption unit 907 decrypts an encrypted content component using a content key (Kc) calculated by the content key calculation unit 905.

The content packet analysis unit 908 separates, from an encrypted content component, update information (Nc) and copy control information (E_EMI) attached thereto and passes the pieces of information to the update information storage unit 903 and copy control information storage unit 904, respectively.

The content packet reception unit 909 receives a content packet.

The HTTP protocol unit 910 performs HTTP client processing, i.e., creates and transmits an HTTP request and receives and analyzes an HTTP response.

FIG. 10 shows a cryptographic communication protocol procedure in the conventional transmission system comprising the transmitter 800 shown in FIG. 8 and the receiver 900 shown in FIG. 9.

A conventional cryptographic communication protocol procedure will be explained below using FIG. 10.

(1001) An authentication key (Kauth) becomes shared through an authentication process between the transmitter 800 and the receiver 900. An authentication key (Kauth) is discarded after one-time authentication.

(1002) The transmitter 800 generates an exchange key (Kx).

(1003) The transmitter 800 encrypts the exchange key (Kx) with the authentication key (Kauth) (to produce Ksx) and transmits Ksx to the receiver 900.

(1004) The receiver 900 decrypts Ksx received with the authentication key (Kauth) and obtains the exchange key (Kx).

(1005) A content request using an HTTP GET request is transmitted from the receiver 900 to the transmitter 800.

(1006) The transmitter 800 generates update information (Nc).

(1007) The transmitter 800 learns of copy control information (E_EMI) for content requested by the receiver 900.

(1008) The transmitter 800 calculates a content key (Kc) using the exchange key (Kx), update information (Nc), and copy control information (E_EMI) as input parameters and using a one-way function.

(1009) The transmitter 800 encrypts the content requested by the receiver 900 with the content key (Kc).

(1010) The transmitter 800 attaches the update information (Nc) and copy control information (E_EMI) to the encrypted content component and transmits the resultant to the receiver as the body of an HTTP GET response.

(1011) The receiver 900 acquires the update information (Nc) from the received response.

(1012) The receiver 900 also acquires the copy control information (E_EMI) from the received response.

(1013) The receiver 900 calculates the content key (Kc) using the exchange key (Kx), update information (Nc), and copy control information (E_EMI) as input parameters and using a one-way function.

(1014) The receiver 900 decrypts the encrypted content component with the content key (Kc).

With the series of steps described above of the protocol procedure, the common exchange key (Kx) (1080, 1090); the update information (Nc) (1081, 1091) and copy control information (E_EMI) (1082, 1092) attached to the content component become shared between the transmitter 800 and the receiver 900. Only the authorized receiver can correctly decrypt the encrypted content component using these parameters.

Although a mechanism for content protection by cryptographic communication between parties concerned sharing an exchange key is established in a conventional system, the characteristics of an IP network to which an indefinite number of devices are connected may cause an authentication problem, the problem of "from whom a content component is transmitted."

More specifically, when a receiver requests content and receives a content, it has no way of verifying whether the received content is an authorized content from an authorized transmitter serving as a destination of request. For example, even if an attacker monitors an IP network, records (caches) an encrypted content component flowing through the IP network, and responds to a request from a receiver using the recorded content component while masquerading as an authorized transmitter, the receiver cannot discern the masquerade.

FIG. 11 shows a chart for explaining a problem in the network configuration of the conventional transmission system. A case which poses a problem will be explained below using FIG. 11.

The transmitter 800 and receiver 900 are devices sharing an exchange key and authorized to perform cryptographic communication. Between the transmitter 800 and the receiver 900, an encrypted content component (1112) with accompanying information is transmitted in response to a content request (1111) from the receiver 900.

An unauthorized device 1100 connected on a network can monitor and record an HTTP request and HTTP response flowing on a bus (1113). Although the unauthorized device 1100 itself cannot utilize a content by, e.g., decrypting and viewing the content, afterward it can, for example, hook an HTTP request from the receiver 900 to the transmitter 800 (1114) and fraudulently substitutes the previously recorded content for the content to be received by the receiver 900 and transmits it while masquerading as the authorized transmitter 800 (1115).

At this time, the receiver 900 cannot determine whether the substituted and transmitted content is an authorized content transmitted from the authorized transmitter 800 or a content transmitted from the unauthorized device 1100. Accordingly, the receiver 900 lets a user utilize the substituted and transmitted content.

The present invention has been made to solve the above-described conventional problem and as its object, provide an authorized content verification method, content transmission and reception system, transmitter, receiver, and the like which can determine whether received content is authorized content.

DISCLOSURE OF THE INVENTION

To solve the above problem, the 1st aspect of the present invention is an authorized content verification method in a content transmission and reception system in which a transmitter connected on a network attaches, to encrypted content, update information updated by the transmitter at a predetermined time and required to create a content key used for content encryption and decryption and transmits the update information with the encrypted content, in response to a content request from a receiver, comprising:

a verification request step of, by the receiver, transmitting an authorization verification request including at least the update information received from the transmitter;

an update information check step of, by the transmitter, checking whether the update information included in the authorization verification request received from the receiver is predetermined update information;

a message-of-acceptance transmission step of, by the transmitter, creating a message of acceptance using the update information and an exchange key shared in advance between the transmitter and the receiver and transmitting the message of acceptance to the receiver, if it is determined that the update information is the predetermined update information; and an authorized content determination step of, by the receiver, determining that the encrypted content being received is authorized content if the receiver receives the message of acceptance from the transmitter.

The 2nd aspect of the present invention is the authorized content verification method according to the 1st aspect of the present invention, wherein the predetermined update information is update information currently in use or update information before a predetermined number of times of updating.

The 3rd aspect of the present invention is the authorized content verification method according to the 1st aspect of the present invention, wherein in the verification request step, the receiver includes, in the authorization verification request, a number which varies with each transmission of the authorization verification request and transmits the authorization verification request, and in the message-of-acceptance transmission step, the transmitter creates the message of acceptance using the number included in the authorization verification request.

The 4th aspect of the present invention is the authorized content verification method according to the 1st aspect of the present invention, wherein in the verification request step, the receiver includes, in the authorization verification request, an identification message created using the exchange key and the update information transmitted from the transmitter and transmits the authorization verification request, and in the message-of-acceptance transmission step, the transmitter transmits the message of acceptance to the receiver if it is determined that the update information is the predetermined update information and verifies that the identification message included in the authorization verification request matches an identification message which is created by the transmitter using the exchange key and the update information.

The 5th aspect of the present invention is the authorized content verification method according to the 1st aspect of the present invention, wherein in the message-of-acceptance transmission step, the transmitter transmits a message of non-acceptance to the receiver if it is determined that the update information is not the predetermined update information, and in the authorized content determination step, the receiver determines that the encrypted content being received is not authorized content and stops utilizing the encrypted content if the receiver receives the message of non-acceptance from the transmitter.

The 6th aspect of the present invention is the authorized content verification method according to the 1st aspect of the present invention, further comprising a verification request retry transmission step of, by the receiver, repeatedly transmitting the authorization verification request for a predetermined period if the receiver cannot receive the message of acceptance in the authorized content determination step, wherein in the authorized content determination step, the receiver stops utilizing the received encrypted content if the receiver cannot receive the message of acceptance even after a lapse of the predetermined period.

The 7th aspect of the present invention is the authorized content verification method according to the 1st aspect of the present invention, further comprising a verification request retry transmission step of, by the receiver, repeatedly transmitting the authorization verification request a predetermined number of times if the receiver cannot receive the message of acceptance in the authorized content determination step, wherein in the authorized content determination step, the receiver stops utilizing the received encrypted content if the receiver cannot receive the message of acceptance even after the predetermined number of times of transmission of the authorization verification request.

The 8th aspect of the present invention is the authorized content verification method according to the 5th aspect of the present invention, further comprising a verification request retransmission step of, by the receiver, repeatedly transmitting the authorization verification request after the receiver stops utilizing the received encrypted content in the authorized content determination step until a predetermined number-of-times limit or predetermined time limit is reached or a predetermined stop condition is met, wherein in the authorized content determination step, the receiver starts utilizing the received encrypted content if the receiver receives the message of acceptance after the receiver stops utilizing the received encrypted content.

The 9th aspect of the present invention is a content transmission and reception system comprising a receiver which transmits a content request and a transmitter connected to the receiver over a network which attaches, to encrypted content, update information updated at a predetermined time and required to create a content key used for content encryption and decryption and transmits the update information with the encrypted content, in response to a content request from the receiver, wherein the receiver has a verification request instrument which transmits an authorization verification request created using an exchange key shared in advance with the transmitter and the update information received from the transmitter, and a verification result check instrument which determines that the encrypted content being received is authorized content if a message of acceptance is received from the transmitter, and the transmitter has a verification request acceptance instrument which receives the authorization verification request transmitted from the receiver, an update information verification instrument which checks whether the update information included in the received authorization verification request is predetermined update information, and a verification response instrument which creates the message of acceptance using the update information and the exchange key shared with the receiver and transmits the message of acceptance to the receiver if it is determined that the update information is the predetermined update information.

The 10th aspect of the present invention is a transmitter used in a content transmission and reception system in which the transmitter connected on a network attaches, to encrypted content, update information updated by the transmitter at a predetermined time and required to create a content key used for content encryption and decryption and transmits the update information with the encrypted content, in response to a content request from a receiver, comprising:

a verification request acceptance instrument which receives an authorization verification request created by the receiver using an exchange key shared in advance with the receiver and the update information received from the transmitter and transmitted from the receiver;

an update information verification instrument which checks whether the update information included in the authorization verification request received from the receiver is predetermined update information; and a verification response instrument which creates a message of acceptance for determining whether the encrypted content being received by the receiver is authorized content, using the update information and the exchange key, and transmitting the message of acceptance to the receiver if it is determined that the update information is the predetermined update information.

The 11th aspect of the present invention is a receiver used in a content transmission and reception system in which a transmitter connected on a network attaches, to encrypted content, update information updated by the transmitter at a predetermined time and required to create a content key used for content encryption and decryption and transmits the update information with the encrypted content, in response to a content request from the receiver, comprising:

a verification request instrument which transmits an authorization verification request created using an exchange key shared in advance with the transmitter and the update information received from the transmitter; and a verification result check instrument which determines that the encrypted content being received is authorized content if a message of acceptance, created using the update information and exchange key and transmitted by the transmitter after determining that the update information included in the received authorization verification request is predetermined update information, is received from the transmitter.

The 13th aspect of the present invention is a recording medium which is processable by a computer having a program recorded thereon for causing a computer to execute the verification request step of, by the receiver, transmitting the authorization verification request, the update information check step of, by the transmitter, checking whether the update information is the predetermined update information, the message-of-acceptance transmission step of, by the transmitter, creating the message of acceptance and transmitting the message of acceptance to the receiver, and the authorized content determination step of, by the receiver, verifying that the transmitter is an authorized transmitter if the message of acceptance is received from the transmitter, in the authorized content verification method in a content transmission and reception system in which a transmitter connected on a network attaches, to encrypted content, update information updated by the transmitter at a predetermined time and required to create a content key used for content encryption and decryption and transmits the update information with the encrypted content, in response to a content request from a receiver, comprising:

a verification request step of, by the receiver, transmitting an authorization verification request including at least the update information received from the transmitter;

an update information check step of, by the transmitter, checking whether the update information included in the authorization verification request received from the receiver is predetermined update information;

a message-of-acceptance transmission step of, by the transmitter, creating a message of acceptance using the update information and an exchange key shared in advance between the transmitter and the receiver and transmitting the message of acceptance to the receiver, if it is determined that the update information is the predetermined update information; and an authorized content determination step of, by the receiver, determining that the encrypted content being received is authorized content if the receiver receives the message of acceptance from the transmitter.

The 14th aspect of the present invention is the authorized content verification method according to the 6th aspect of the present invention, further comprising a verification request retransmission step of, by the receiver, repeatedly transmitting the authorization verification request after the receiver stops utilizing the received encrypted content in the authorized content determination step until a predetermined number-of-times limit or predetermined time limit is reached or a predetermined stop condition is met, wherein in the authorized content determination step, the receiver starts utilizing the received encrypted content if the receiver receives the message of acceptance after the receiver stops utilizing the received encrypted content.

The 15th aspect of the present invention is the authorized content verification method according to the 7th aspect of the present invention, further comprising a verification request retransmission step of, by the receiver, repeatedly transmitting the authorization verification request after the receiver stops utilizing the received encrypted content in the authorized content determination step until a predetermined number-of-times limit or predetermined time limit is reached or a predetermined stop condition is met, wherein in the authorized content determination step, the receiver starts utilizing the received encrypted content if the receiver receives the message of acceptance after the receiver stops utilizing the received encrypted content.

According to the present invention, there can be provided an authorized content verification method, content transmission and reception system, transmitter, receiver, and the like which can determine whether received content is authorized content.

Figure 1:
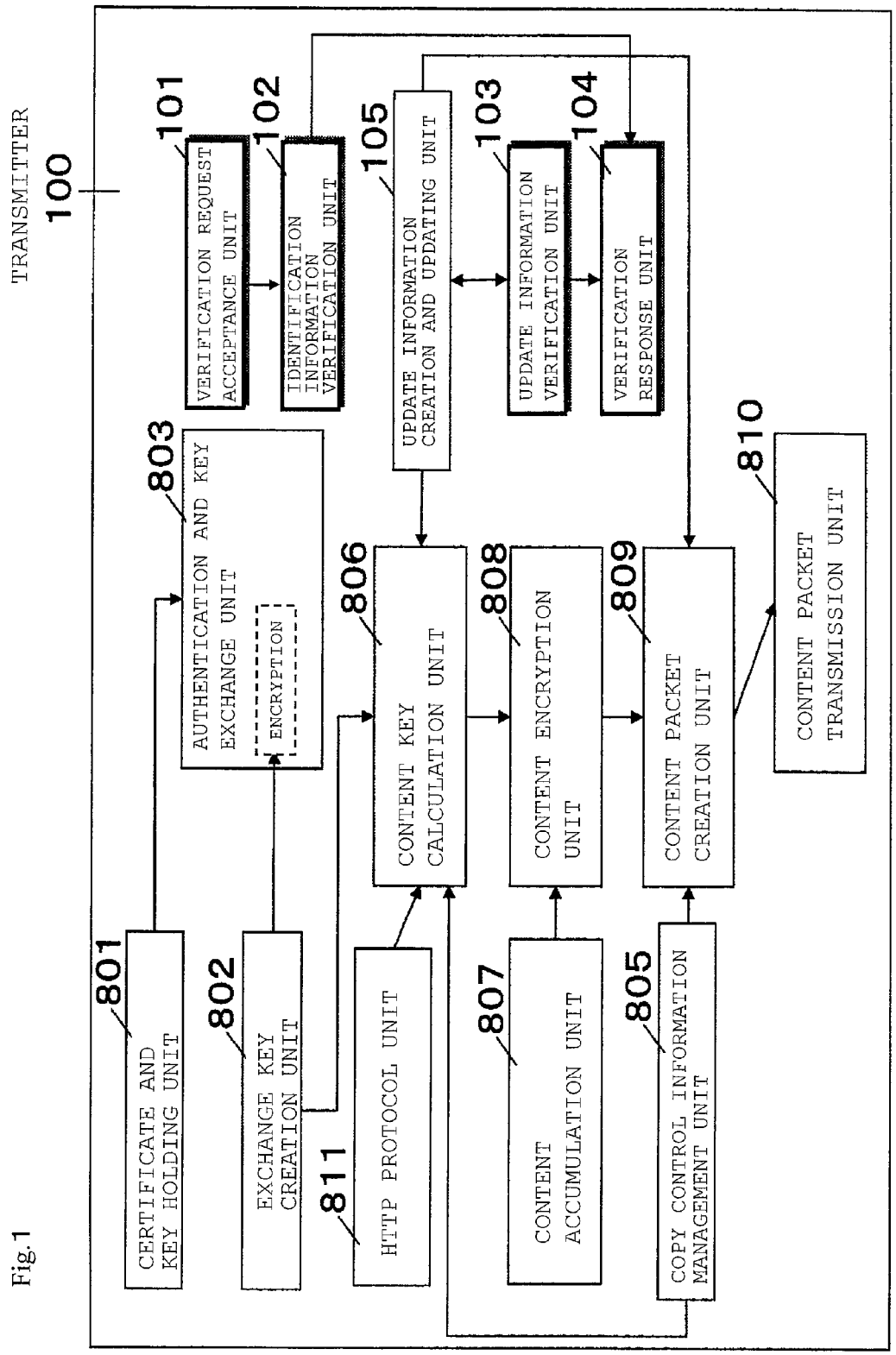
FIG. 1 is a diagram showing functional blocks of a transmitter used in a content transmission and reception system according to a first embodiment of the present invention.

DESCRIPTION OF SYMBOLS 100 transmitter
101 verification request acceptance unit
102 identification information verification unit
103 update information verification unit
104 verification response unit
105 update information creation and updating unit
200, 400, 600 receiver
201 verification parameter generation unit
202, 601 verification request unit
203 verification result check unit
204, 402, 602 content packet reception unit
205, 403 content utilization unit
401 retry determination unit
801 certificate and key holding unit
802 exchange key creation unit
803 authentication and key exchange unit
805 copy control information management unit
806 content key calculation unit
807 content accumulation unit
808 content encryption unit
809 content packet creation unit
810 content packet transmission unit
901 certificate and key holding unit
902 authentication and key exchange unit
903 update information storage unit
904 copy control information storage unit
905 content key calculation unit
907 content decryption unit
908 content packet analysis unit
910 HTTP protocol unit

BEST MODE FOR CARRYING OUT THE INVENTION

A case will be explained below where an authorized content verification method of the present invention is adapted to a conventional transmission system. Note that in embodiments below, processes and configurations same as or corresponding to those in the above-described conventional example are denoted by the same reference numerals, and a detailed explanation thereof will be omitted.

First Embodiment

FIG. 1 is a functional block diagram of a transmitter used in a content transmission and reception system according to a first embodiment of the present invention.

Figure 8:
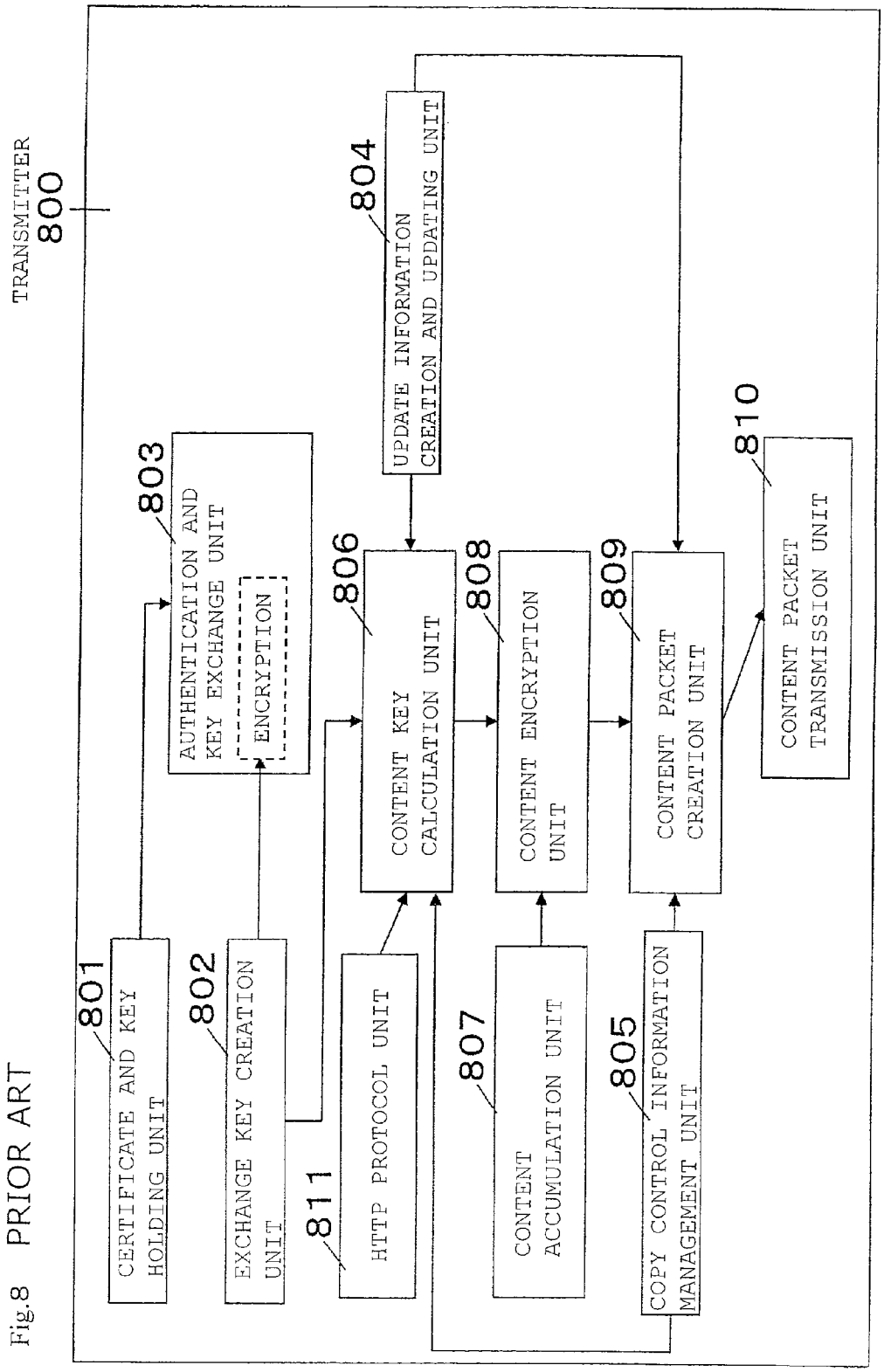
FIG. 8 is a diagram showing functional blocks of a transmitter in a conventional transmission system.

A transmitter 100 comprises a certificate and key holding unit 801, an exchange key creation unit 802, an authentication and key exchange unit 803, a copy control information management unit 805, a content key calculation unit 806, a content accumulation unit 807, a content encryption unit 808, a content packet creation unit 809, a content packet transmission unit 810, and an HTTP protocol unit 811, similarly to the conventional transmitter 800 shown in FIG. 8. The transmitter 100 further comprises a verification request acceptance unit 101, an identification information verification unit 102, an update information verification unit 103, a verification response unit 104, and an update information creation and updating unit 105.

Note that the verification request acceptance unit 101, update information verification unit 103, and verification response unit 104 are an example of the verification request acceptance instrument, an example of the update information verification instrument, and an example of the verification response instrument, respectively, of the present invention.

The verification request acceptance unit 101 receives, from a receiver, a verification request which is composed of update information (test_Nc), a given number (N=a number; a different number is designated by the receiver each time the receiver makes a verification request), and identification information.

The identification information verification unit 102 verifies whether the identification information included in the received verification request is information indicating a correct receiver. The identification information is calculated using the update information (test_Nc) and given number (N) included in the verification request and an exchange key (Kx) shared with the receiver. By a similar calculation, the transmitter can verify whether the identification information is the correct identification information.

For example, assume that the identification information is the low-order 80 bits of a value (160 bits) obtained by inputting a number generated by concatenating the components of the exchange key (Kx) to a hash function, adding the calculated hash value, update information (test_Nc), and given number (N), and inputting the sum to the hash function. A hash value is a value like a pseudo-random number, where the original cannot be reproduced from the hash value. Accordingly, an unauthorized device cannot decrypt the exchange key (Kx) from the identification information.

Note that the verification request is an example of the authorization verification request of the present invention and that the identification information is an example of the identification message of the present invention.

The update information creation and updating unit 105 newly creates or updates update information (Nc), similarly to the update information creation and updating unit 804 of the conventional transmitter 800. At the same time, the update information creation and updating unit 105 holds update information (pre_Nc) before updating.

The update information verification unit 103 verifies whether the update information (test_Nc) included in the received verification request matches update information currently in use by the transmitter 100 for content transmission. The update information in use refers to the update information (Nc) managed by the update information creation and updating unit 105 or immediately preceding update information (pre_Nc). In consideration of the possibility that the update information may be changed at short intervals, a plurality of pieces of update information previously used may be held as immediately preceding update information.

The update information in use used to verify whether it matches the update information (test_Nc) is an example of the predetermined update information of the present invention. The plurality of pieces of update information previously used are examples of the update information before the predetermined number of times of updating of the present invention.

If the identification information verification unit 102 and update information verification unit 103 determine yes, the verification response unit 104 creates a message of acceptance using the update information (test_Nc) and given number (N) received from the receiver and the exchange key (Kx) shared with the receiver and transmits the message of acceptance to the receiver.

For example, the message of acceptance is calculated in the following manner. A number generated by concatenating the components of the exchange key (Kx) is input to the hash function, and a hash value is calculated. The calculated hash value and the update information (test_Nc) and given number (N) from the receiver are added, and the high-order 80 bits of a value (160 bits) obtained by inputting the sum to the hash function is used as the message of acceptance.

On the other hand, if the identification information verification unit 102 or update information verification unit 103 determines no, the verification response unit 104 creates a message of non-acceptance and transmits the message of non-acceptance to the receiver.

In view of the purpose of the message of non-acceptance, it suffices to use a value different from that for the message of acceptance for the message of non-acceptance. For example, the low-order 80 bits of a value obtained in the same manner as the message of acceptance may be used. Alternatively, the high-order 80 bits of a value obtained by changing (e.g., adding 1 to) the given number (N) used to calculate a hash value, as in the case of the message of acceptance, may be used.

Figure 2:
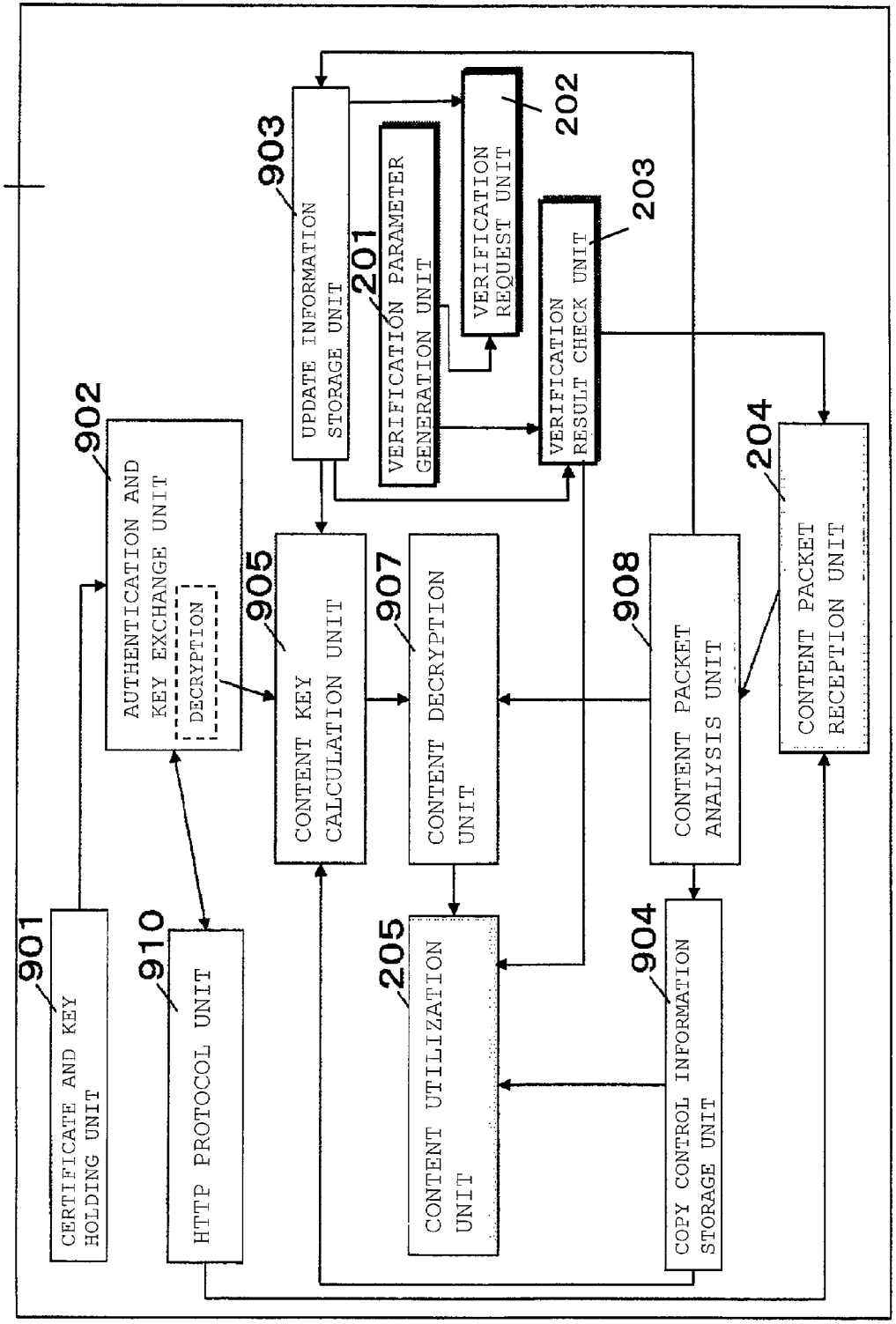
FIG. 2 is a diagram showing functional blocks of a receiver used in the content transmission and reception system according to the first embodiment of the present invention.

FIG. 2 is a functional block diagram of a receiver used in the content transmission and reception system according to the first embodiment.

Figure 9:
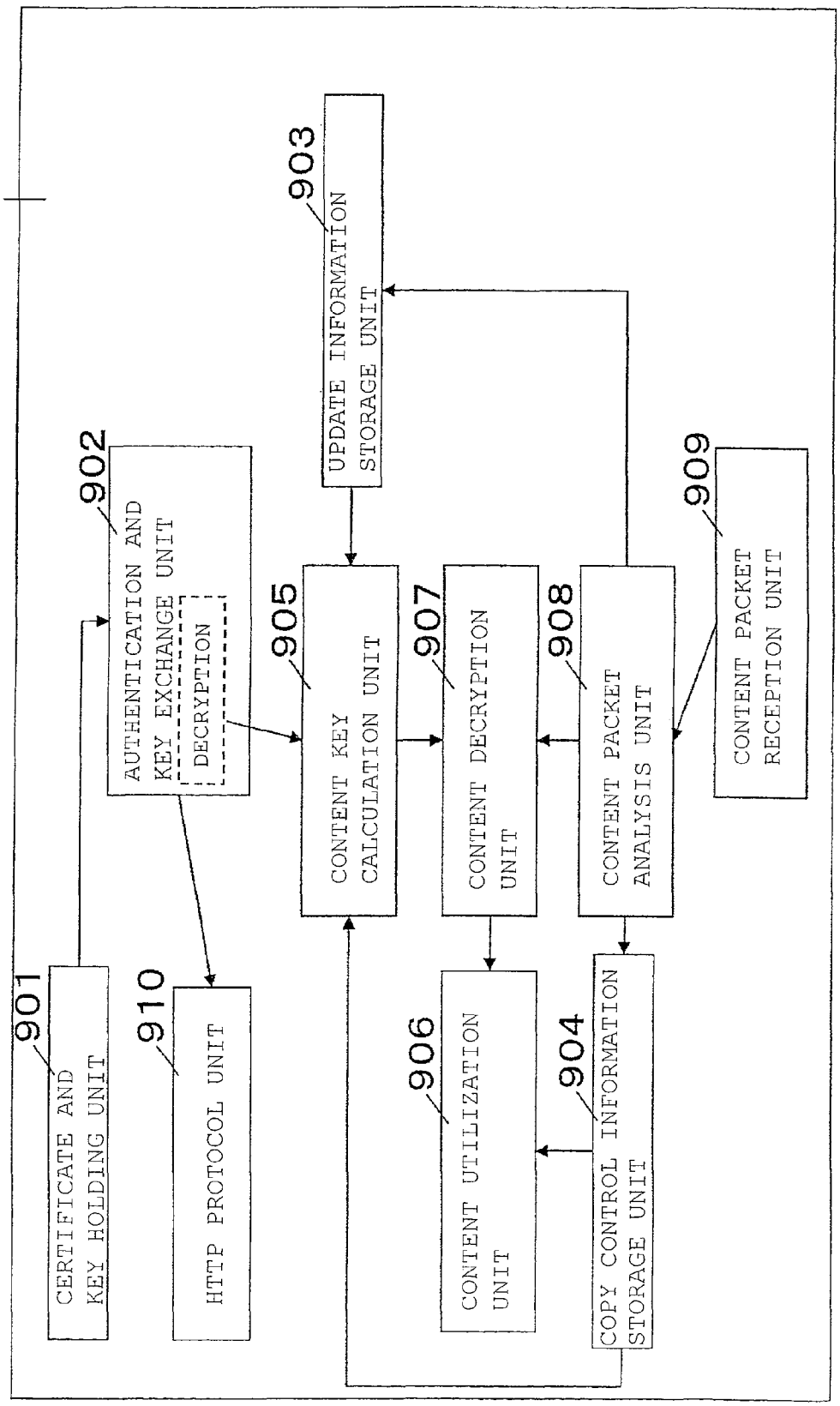
FIG. 9 is a diagram showing functional blocks of a receiver in the conventional transmission system.

A receiver 200 comprises a certificate and key holding unit 901, an authentication and key exchange unit 902, an update information storage unit 903, a copy control information storage unit 904, a content key calculation unit 905, a content decryption unit 907, a content packet analysis unit 908, and an HTTP protocol unit 910, similarly to the conventional receiver 900 shown in FIG. 9. The receiver 200 further comprises a verification parameter generation unit 201, a verification request unit 202, a verification result check unit 203, a content packet reception unit 204, and a content utilization unit 205.

Note that the verification request unit 202 and verification result check unit 203 are an example of the verification request instrument and an example of the verification result check instrument, respectively, of the present invention.

The verification parameter generation unit 201 generates a different number (N) with each verification request. The verification parameter generation unit 201 calculates identification information using update information (Nc) and the generated given number (N) and an exchange key (Kx) shared with a transmitter. A method for calculating identification information has been described above, and an explanation thereof will be omitted.

The verification request unit 202 transmits a verification request which is composed of update information (Nc, which is attached to an encrypted component of content currently being received and turned into test_Nc) stored in the update information storage unit 903, the given number (N) generated by the verification parameter generation unit 201, and the identification information to the transmitter.

The verification result check unit 203 verifies whether a response message received from the transmitter is a message of acceptance. At this time, in order to verify whether the response message is a message of acceptance, the verification result check unit 203 calculates a message of acceptance using the transmitted update information (test_Nc) and given number (N) and the exchange key (Kx) shared with the transmitter in the same manner as the verification response unit 104 of the transmitter calculates the message of acceptance and compares the message of acceptance with the response message received from the transmitter. A method for calculating a message of acceptance has been described above, and an explanation thereof will be omitted.

The content packet reception unit 204 receives the result of determination by the verification result check unit 203. If it is determined that the response message received from the transmitter is not a message of acceptance, the content packet reception unit 204 discards a content packet received as the body of an HTTP response including a content component until the last received such HTTP response. On the other hand, if it is determined that the response message received from the transmitter is a message of acceptance, i.e., the content is being transmitted from an authorized transmitter, the content packet reception unit 204 determines that it is receiving correct content and continues receiving the content.

The content utilization unit 205 receives the result of determination by the verification result check unit 203. If it is determined that the response message received from the transmitter is not a message of acceptance, the content utilization unit 205 stops utilizing the content. On the other hand, if it is determined that the response message received from the transmitter is a message of acceptance, i.e., the content is being transmitted from an authorized transmitter, the content utilization unit 205 determines that it is receiving correct content and continues utilizing the content.

Figure 3:
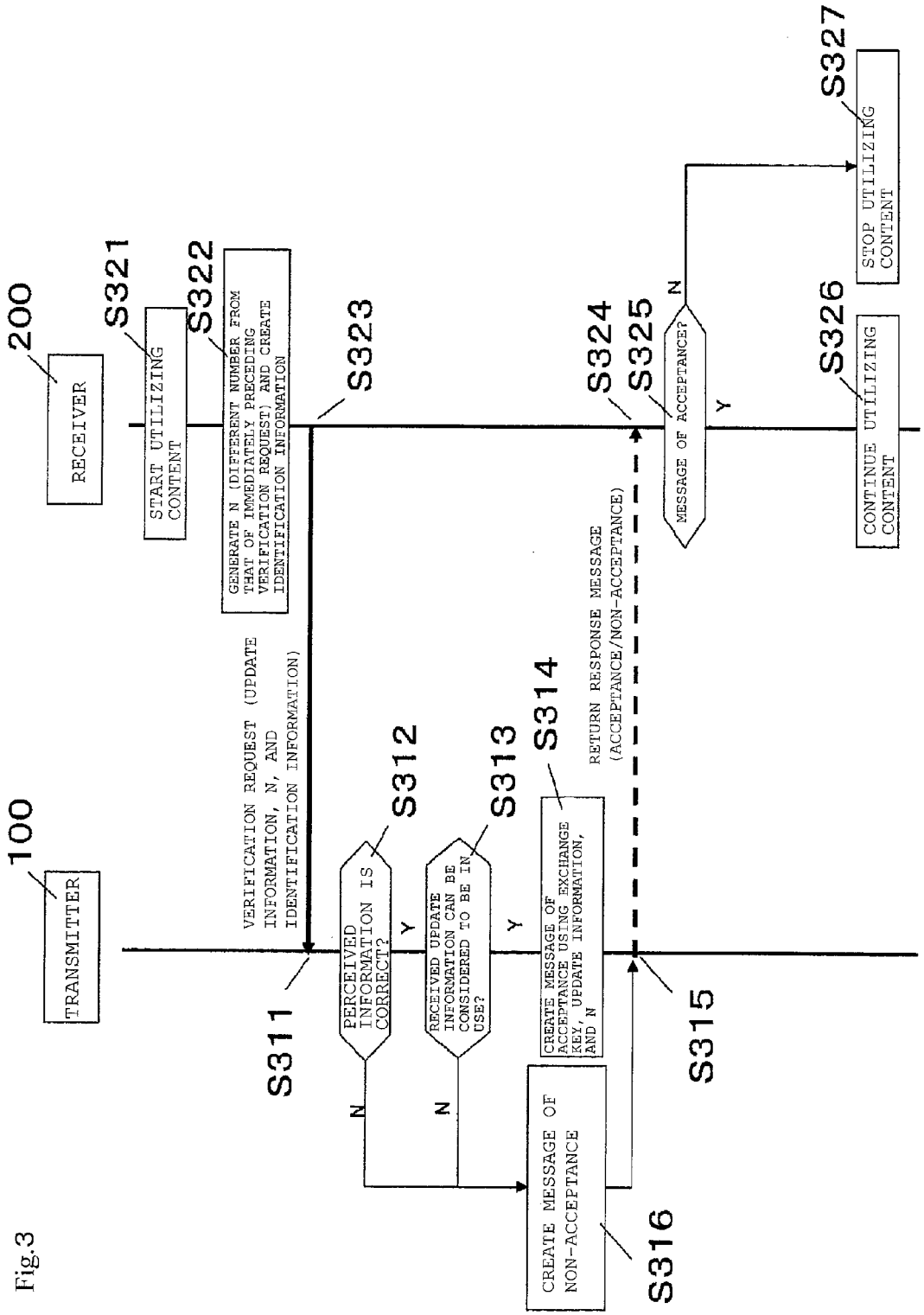
FIG. 3 is a chart showing a procedure in the content transmission and reception system according to the first embodiment of the present invention.
Figure 10:
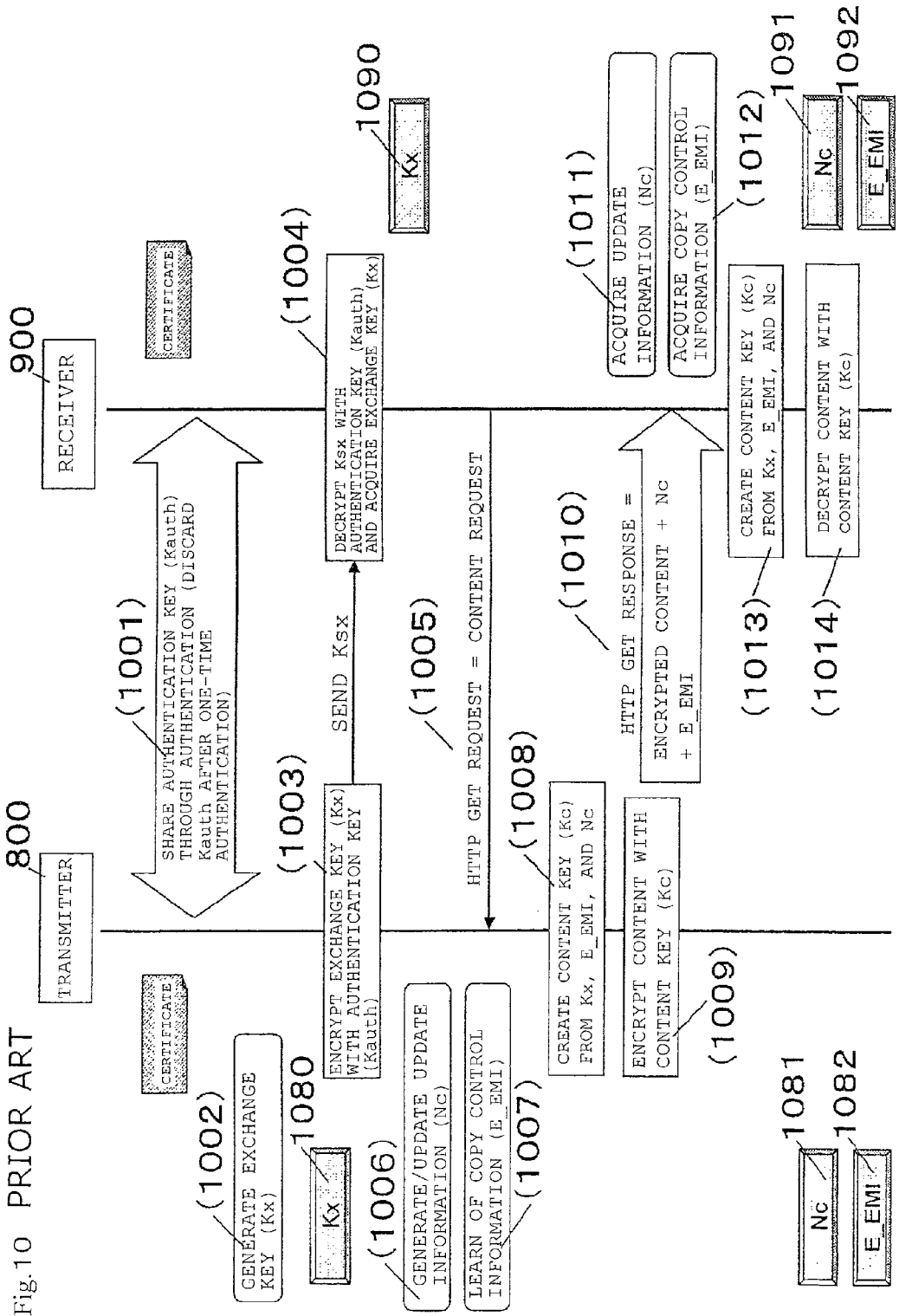
FIG. 10 is a chart showing a cryptographic communication protocol procedure in the conventional transmission system.
Figure 11:
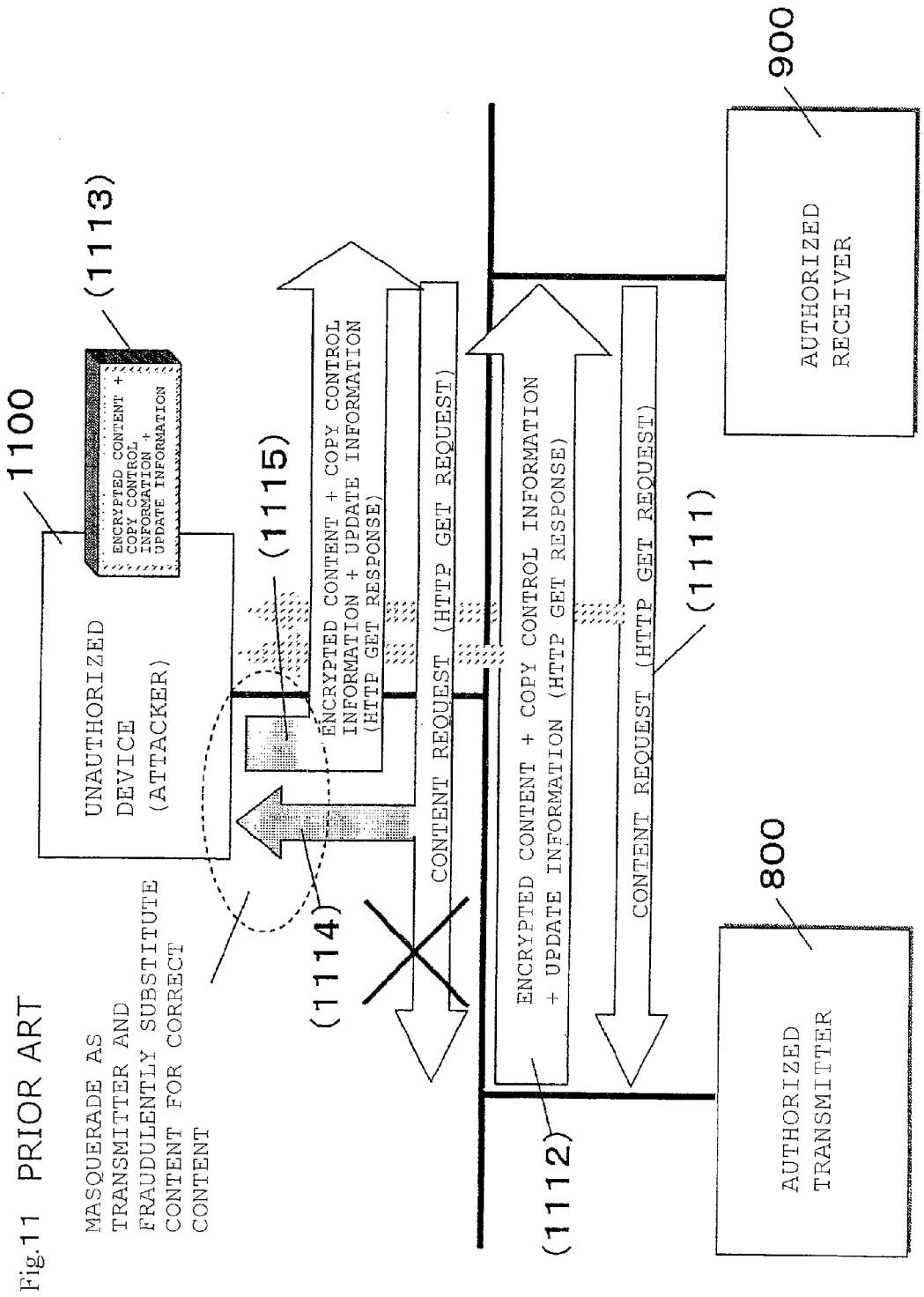
FIG. 11 is a chart for explaining a problem in the network configuration of the conventional transmission system.

FIG. 3 is a chart showing a procedure (protocol) in the content transmission and reception system of the first embodiment comprising the transmitter 100 in FIG. 1 and the receiver 200 in FIG. 2. The procedures for authentication and key sharing and content request and reception are the same as those of the above-described conventional example in FIG. 10, and an explanation thereof will be omitted.

The protocol operation of the receiver 200 when verifying whether received content is authorized will first be explained using FIGS. 2 and 3.

Step S5321: The content utilization unit 205 starts utilizing decrypted components of content.

Step S322: The verification parameter generation unit 201 generates a given number (N) and creates identification information. At this time, N is generated to be different from a number used in an immediately preceding verification request.

Step S323: The verification request unit 202 creates a verification request using update information (Nc) attached to a content component and the given number (N) and identification information and transmits the verification request.

Step S324: The verification result check unit 203 receives a response message from the transmitter 100.

Step S325: The verification result check unit 203 verifies whether the received response message is a message of acceptance. If the received response message is a message of acceptance, the flow shifts to step S326 to continue utilizing the content. On the other hand, if the received response message is not a message of acceptance, the flow shifts to step S327 to stop utilizing the content.

Step S326: The content utilization unit 205 continues utilizing decrypted content.

Step S327: The content utilization unit 205 stops utilizing the content, and the content packet reception unit 204 discards a content packet being received.

The protocol operation of the transmitter 100 when verifying whether the receiver is receiving authorized content will be explained using FIGS. 1 and 3.

Step S311: The verification request acceptance unit 101 receives the verification request from the receiver.

Step S312: The identification information verification unit 102 determines whether the identification information included in the received verification request is correct. If the identification information is correct, the flow shifts to step S313 to verify the update information. On the other hand, if the identification information is not correct, the flow shifts to step S316 to create a message of non-acceptance.

Step S313: The update information verification unit 103 determines whether the update information included in the received verification request can be considered to be in use. If the update information is in use, the flow shifts to step S314 to create a message of acceptance. On the other hand, if the update information is not in use, the flow shifts to step S316 to create a message of non-acceptance.

Step S314: The verification response unit 104 creates a message of acceptance using the update information and given number (N) received from the receiver 200 and an exchange key (Kx) shared with the receiver.

Step S316: The verification response unit 104 creates a message of non-acceptance different from a message of acceptance. The flow shifts to step S315.

Step S315: The verification response unit 104 transmits the response message (the message of acceptance or message of non-acceptance).

Note that step S323 is an example of the verification request step of the present invention and that step S325 is an example of the authorized content determination step of the present invention. Also note that step S313 is an example of the update information check step of the present invention and that the process obtained by combining steps S314 and S315 is an example of the message-of-acceptance transmission step.

Update information is updated by a transmitter according to a predetermined rule. Accordingly, if an unauthorized device fraudulently substitutes a content component for a correct one, update information attached to the substituted content component does not match update information held by the transmitter at that time. Thus, the transmitter can verify, from update information included in a verification request transmitted from a receiver, whether the receiver is currently receiving the correct content.

Since a message of acceptance serving as a verification result notification is created using an exchange key shared in advance between an authorized transmitter and a receiver in question, the receiver can verify whether a received message of acceptance is a message transmitted from the authorized transmitter. This makes it possible to identify a fraudulently substituted content component transmitted from an unauthorized and masquerading device.

Since updating of update information in a transmitter is internal processing, updating may be performed before a receiver receives a content component to which update information immediately before the updating is attached. Inclusion of immediately preceding update information among objects of acceptance in consideration of this possibility achieves the effect of reducing the frequency of erroneous determinations as to whether a correct content component is transmitted and received.

A different number is used with each verification request. With this configuration, for example, even if an unauthorized device stores in advance combinations of update information and a message of acceptance exchanged between a transmitter and a receiver, and the unauthorized device transmits a message of acceptance stored corresponding to a verification request when the receiver transmits the verification request during reception of a fraudulently substituted content component from a masquerading device, it is possible to prevent the receiver from successful identification.

Inclusion of identification information created using an exchange key shared in advance between an authorized transmitter and a receiver in question in a verification request makes it possible to prevent an unauthorized device from acquiring a corresponding message of acceptance even if the unauthorized device transmits update information currently in use to the transmitter. Accordingly, it is possible to prevent the receiver from successful identification during reception of a fraudulently substituted content component from a masquerading device.

If a receiver cannot receive a message of acceptance, i.e., it receives a message of non-acceptance, it stops utilizing received content. This makes it possible to prevent a fraudulently substituted content from an unauthorized and masquerading device from being made available to a user due to interference of an unauthorized device.

Although the first embodiment has explained a case where content is transmitted and received between a transmitter and a receiver using the HTTP protocol, the present invention is not limited to this. The present invention can also be applied to a case where a transmitter delivers content in real time through streaming technology.

Second Embodiment

Figure 4:
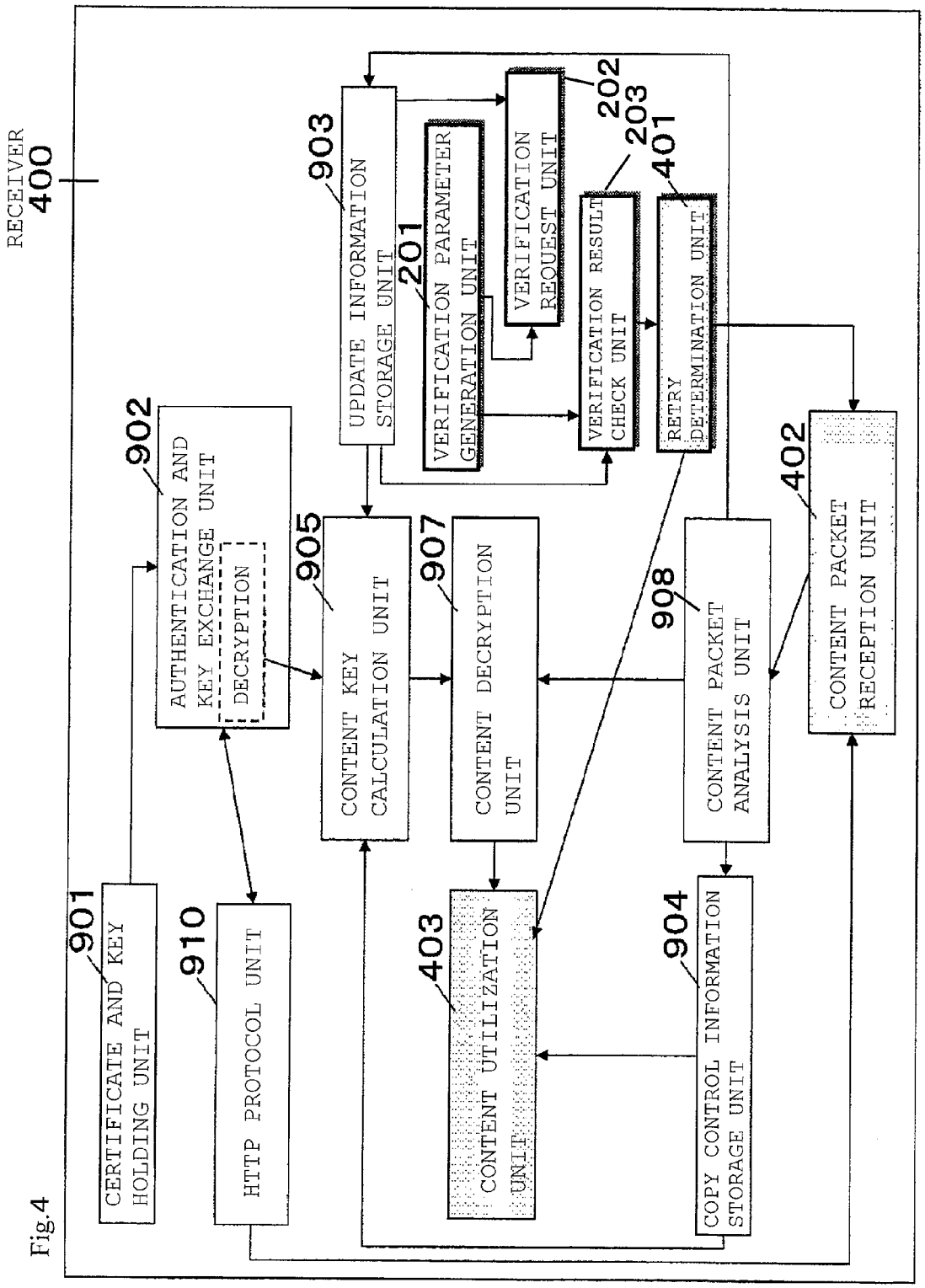
FIG. 4 is a diagram showing functional blocks of a receiver used in a content transmission and reception system according to a second embodiment of the present invention.

FIG. 4 is a functional block diagram of a receiver used in a content transmission and reception system according to a second embodiment of the present invention. The configuration of a transmitter used in the content transmission and reception system of the second embodiment is the same as that of the first embodiment and is as shown in FIG. 1.

Differences of the second embodiment from the first embodiment will be explained. In the second embodiment, a receiver retries making a verification request to a transmitter up to a predetermined number of times.

A receiver 400 comprises a certificate and key holding unit 901, an authentication and key exchange unit 902, an update information storage unit 903, a copy control information storage unit 904, a content key calculation unit 905, a content decryption unit 907, a content packet analysis unit 908, an HTTP protocol unit 910, a verification parameter generation unit 201, a verification request unit 202, and a verification result check unit 203, similarly to the receiver 200 of the first embodiment shown in FIG. 2. The receiver 400 further comprises a retry determination unit 401, a content packet reception unit 402, and a content utilization unit 403.

The retry determination unit 401 determines whether to make a retry, if the verification result check unit 203 determines no. For example, assume that whether to make a retry is determined on the basis of the number of verification requests made and that the retry determination unit 401 determines not to make any more retry if two verification requests are already made in succession using a single piece of update information.

The content packet reception unit 402 receives the result of determination by the verification result check unit 203 via the retry determination unit 401. If it is determined that a response message received from a transmitter is not a message of acceptance, the content packet reception unit 402 discards a content packet received as the body of an HTTP response including a content component until the last received such HTTP response. On the other hand, if it is determined that the response message received from the transmitter is a message of acceptance, i.e., the content is being transmitted from an authorized transmitter, the content packet reception unit 402 determines that it is receiving correct content and continues receiving the content.

The content utilization unit 403 receives the result of determination by the verification result check unit 203 via the retry determination unit 401. If it is determined that a response message received from a transmitter is not a message of acceptance, the content utilization unit 403 stops utilizing the content. On the other hand, if it is determined that the response message received from the transmitter is a message of acceptance, i.e., the content is being transmitted from an authorized transmitter, the content utilization unit 403 determines that it is receiving correct content and continues utilizing the content.

Figure 5:
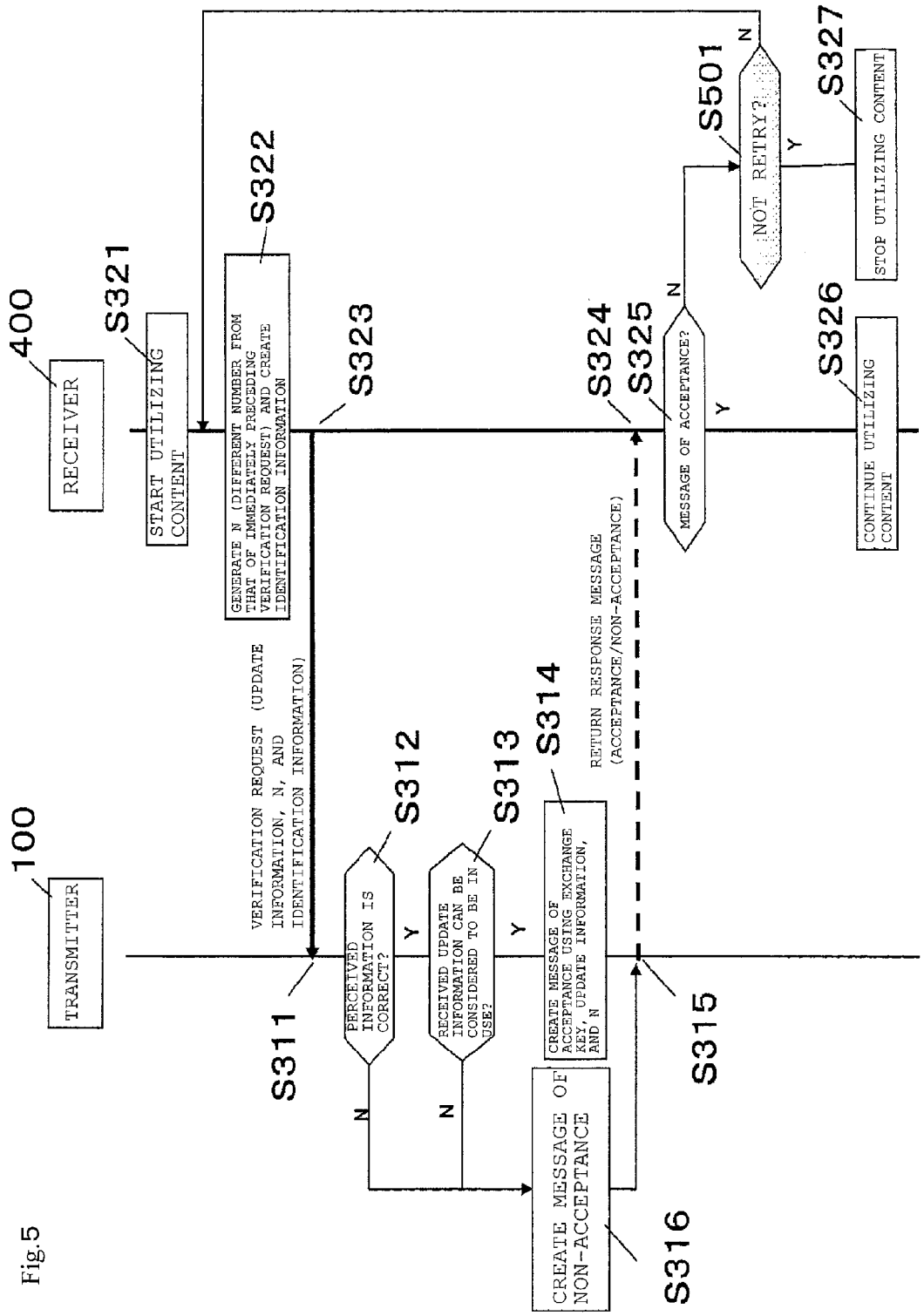
FIG. 5 is a chart showing a procedure in the content transmission and reception system according to the second embodiment of the present invention.

FIG. 5 is a chart showing a procedure (protocol) in the content transmission and reception system of the second embodiment comprising the transmitter 100 in FIG. 1 and the receiver 400 in FIG. 4.

The protocol operation of the receiver 400 when verifying whether received content is authorized will be explained using FIGS. 4 and 5. Steps S321 to S324 are the same as those of the first embodiment in FIG. 3, and an explanation thereof will be omitted.

Step S325: The verification result check unit 203 verifies whether a received response message is a message of acceptance. If the response message is a message of acceptance, the flow shifts to step S326 to continue utilizing content. On the other hand, if the response message is not a message of acceptance, the flow shifts to step S501 to determine whether to make a retry.

Step S326: The content utilization unit 403 continues utilizing decrypted content.

Step S501: The retry determination unit 401 determines whether to retry making a verification request. If the retry determination unit 401 determines to make a retry, the flow returns to step S322 to prepare for transmission of a verification request. Otherwise, the flow shifts to step S327.

In this example, the retry determination unit 401 has a "limitation of the number of retries using a single piece of update information up to two" set therein. Accordingly, if the determination in step S501 is performed again after the second retry transmission of a verification request, the flow does not return to step S322 and shifts to step S327.

Note that step S501 is an example of the verification request retry transmission step of the present invention. The predetermined maximum number of retries set in the retry determination unit 401, or two times in the above example, is an example of the predetermined number of times an authorization verification request is transmitted in the verification request retry step of the present invention.

Step S327: The content utilization unit 403 stops utilizing the content, and the content packet reception unit 402 discards a content packet being received.

Use of the receiver 400 of the second embodiment achieves the effect of reducing, by a retry, the frequency of erroneous determinations as to whether a correct content component is transmitted and received. At the same time, setting of the maximum number of retries makes it possible to prevent a content component from being made available (viewable) while a receiver is permanently repeating a retry due to interference of the unauthorized device.

Note that although the predetermined maximum number of retries is two in the second embodiment explained above, the number of times only needs to be appropriately set according to the status of use, use environment, and the like of a content transmission and reception system used.

Although retries are limited in terms of the number of times in the second embodiment, they may be limited in terms of period (time). In that case as well, the same effects can be obtained.

If a period is set in the retry determination unit 401 as a retry limiting element, and the determination in step S501 is performed during the set period, the flow returns to step S322. On the other hand, if the determination in step S501 is performed after a lapse of the set period, the flow does not return to step S322 and shifts to step S327. The period set in the retry determination unit 401 as the retry limiting element is an example of the predetermined period for an authorization verification request repeatedly transmitted in the verification request retry transmission step of the present invention.

In the second embodiment, update information used at the time of a retry is fixed and identical to update information used in the first verification request. However, the former update information may be synchronized with update information which varies with a received content component.

Third Embodiment

Figure 6:
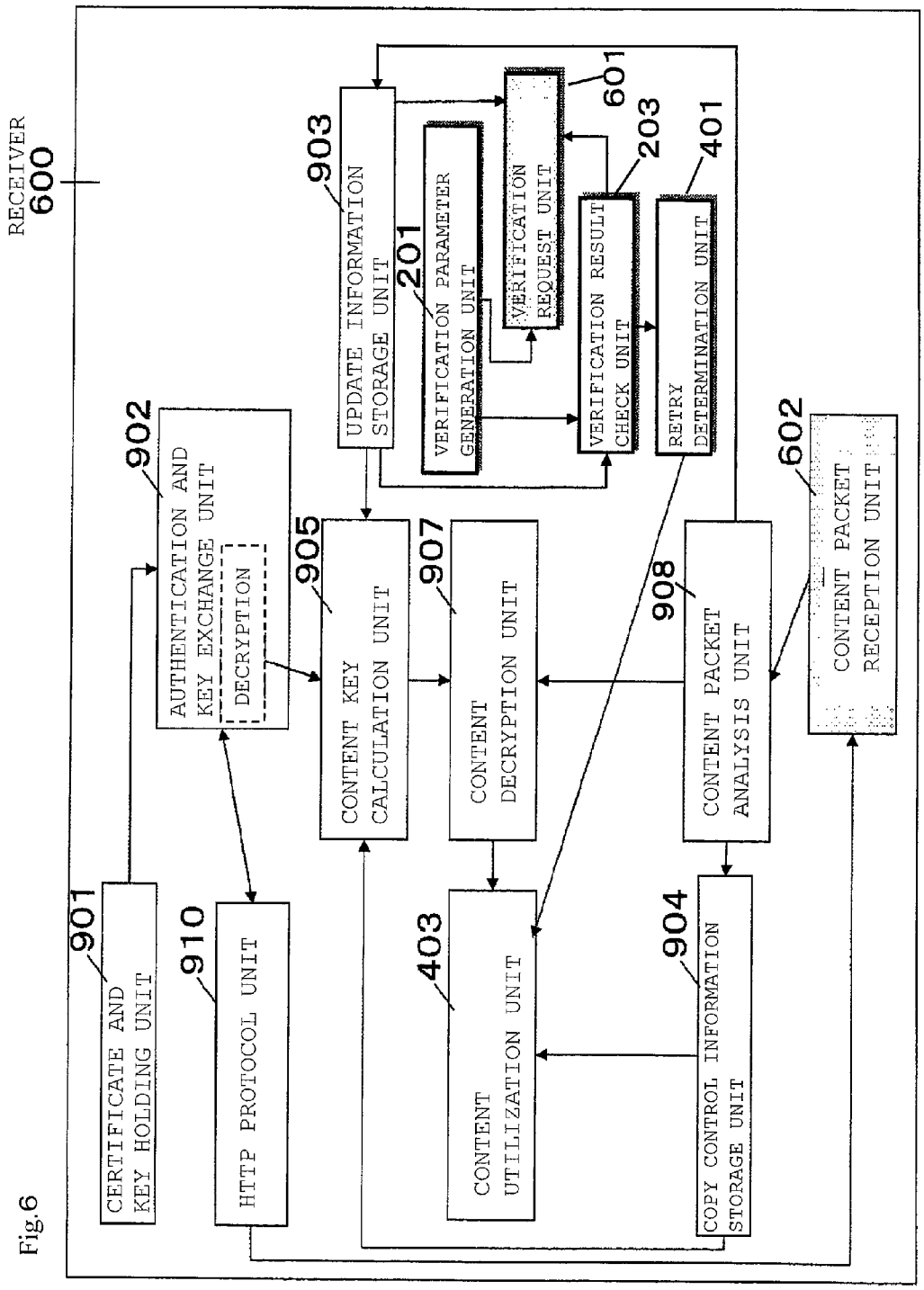
FIG. 6 is a diagram showing functional blocks of a receiver used in a content transmission and reception system according to a third embodiment of the present invention.

FIG. 6 is a functional block diagram of a receiver used in a content transmission and reception system according to a third embodiment of the present invention. The configuration of a transmitter used in the content transmission and reception system of the third embodiment is the same as that of the first embodiment and is as shown in FIG. 1.

Differences of the third embodiment from the first embodiment will be explained. In the third embodiment, a receiver continues making a verification request even after stopping utilizing received content until the receiver succeeds in receiving a message of acceptance.

A receiver 600 comprises a certificate and key holding unit 901, an authentication and key exchange unit 902, an update information storage unit 903, a copy control information storage unit 904, a content key calculation unit 905, a content decryption unit 907, a content packet analysis unit 908, an HTTP protocol unit 910, a verification parameter generation unit 201, a verification result check unit 203, a retry determination unit 401, and a content utilization unit 403, similarly to the receiver 400 of the second embodiment shown in FIG. 4. The receiver 600 further comprises a verification request unit 601 and a content packet reception unit 602.

The verification request unit 601 transmits a verification request to a transmitter even after utilization of content is stopped. For example, assume that intervals at which a verification request is transmitted are repeats of a retry restart time set in advance.

Upon receipt of a request from the verification request unit 601, the content packet reception unit 602 does not discard a content packet being received and passes the content packet to the content packet analysis unit 908. This is intended to store update information (Nc) and copy control information (E_EMI) attached to a content component currently being received which are required for creation of a verification request.

Figure 7:
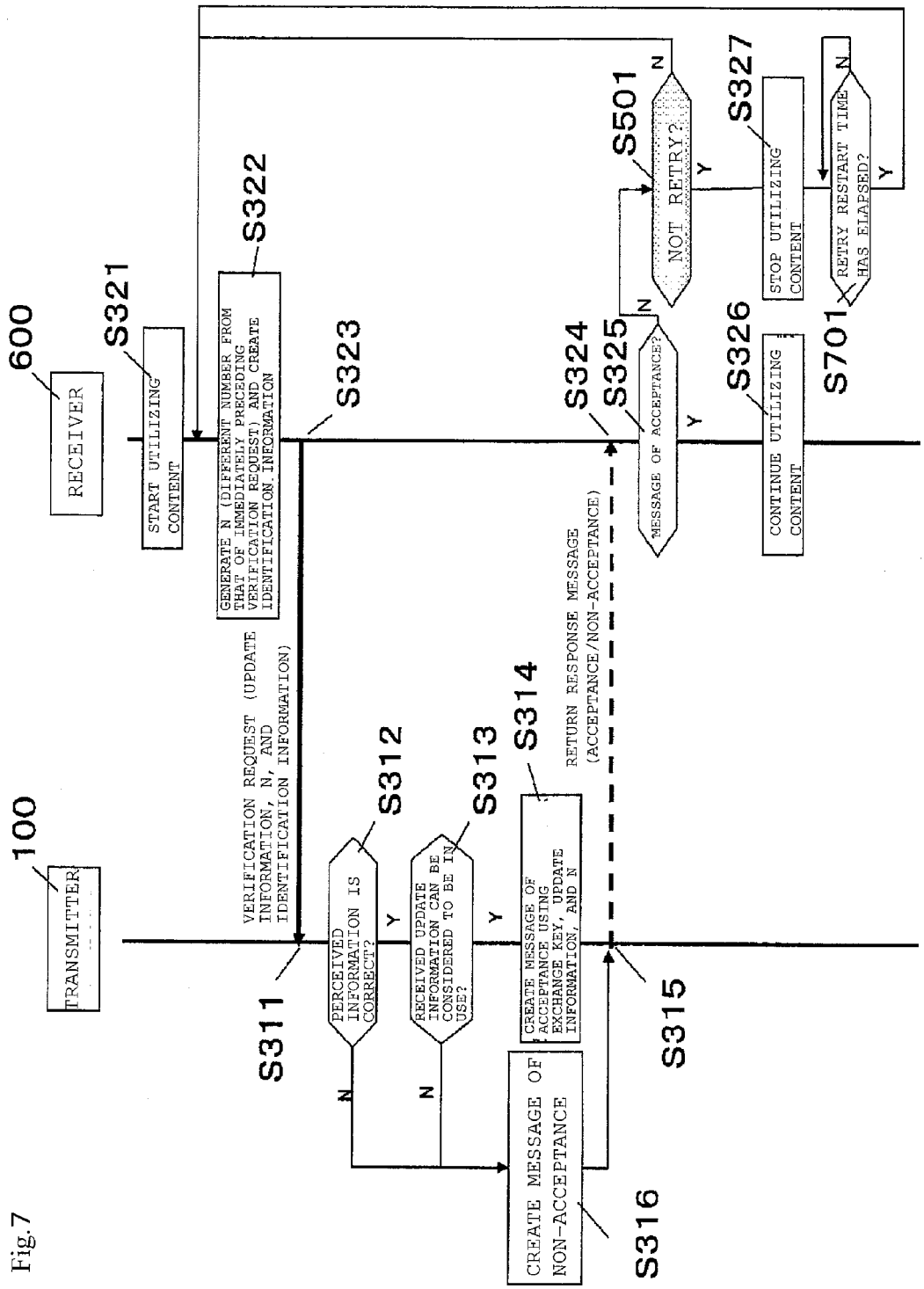
FIG. 7 is a chart showing a procedure in the content transmission and reception system according to the third embodiment of the present invention.

FIG. 7 is a chart showing a procedure (protocol) in the content transmission and reception system of the third embodiment comprising the transmitter 100 in FIG. 1 and the receiver 600 in FIG. 6.

The protocol operation of the receiver 600 when verifying whether received content is authorized will be explained using FIGS. 6 and 7. Steps S321 to S327 are the same as those of the second embodiment described above in FIG. 5, and an explanation thereof will be omitted.

Step S701: The verification request unit 601 verifies whether a retry restart time has elapsed since an immediately preceding verification request was transmitted. If the retry restart time has elapsed, the verification request unit 601 causes the content packet reception unit 602 to stop discarding a received content packet, and the flow returns to step S322 to transmit a verification request. Note that step S701 is an example of the verification request retransmission step of the present invention.

Accordingly, when an unauthorized device finishes masquerading, reception can be immediately restarted.

Note that a number-of-times limit or time limit for a retry may be set in the verification request unit 601 to prevent unlimited retries. Consecutive repeats of the determination in step S701 are limited on the basis of the number of consecutive repeats or an elapsed time from the first determination. If the number-of-times limit or time limit is reached, retry transmission of a verification request is stopped until a content request from the receiver 600 or the like is transmitted.

The number-of-times limit or time limit set in the verification request unit 601 is an example of the predetermined number-of-times limit or predetermined time limit imposed on repeats of transmission of an authorization verification request in the verification request retransmission step of the present invention.

Setting of the number-of-times limit (or time limit) set to restart retrying to be a sufficiently large number (or a sufficiently long time) makes it possible to reliably receive a message of acceptance from an authorized transmitter after an unauthorized device finishes masquerading.

Retrying may be stopped if a predetermined stop condition such as issuance of a stop instruction from a user is met.

Note that although in the third embodiment, intervals at which a verification request is issued after utilization of content is stopped are repeats of a retry restart time, a user may input and designate when to issue a verification request.

As has been explained above, use of the authorized content verification method of the present invention allows a transmitter to verify, from update information transmitted from a receiver, whether the receiver is currently receiving correct content. Since a message of acceptance serving as a verification result notification is created using an exchange key shared in advance between an authorized transmitter and a receiver in question, the receiver can verify whether a received message of acceptance is a message transmitted from an authorized transmitter. This makes it possible to identify a fraudulently substituted content component from an unauthorized and masquerading device.

Since updating of update information in a transmitter is internal processing, updating may be performed before a receiver receives a content component to which update information immediately before the updating is attached. Inclusion of not only update information currently in use but also immediately preceding update information among objects of acceptance in consideration of this possibility achieves the effect of reducing the frequency of erroneous determinations as to whether a correct content component is transmitted and received.

A different number is used with each verification request. With this configuration, for example, even if an unauthorized device stores in advance combinations of update information and a message of acceptance exchanged between a transmitter and a receiver, and the unauthorized device transmits a message of acceptance stored corresponding to a verification request when the receiver transmits the verification request during reception of a fraudulently substituted content component from a masquerading device, it is possible to prevent the receiver from successful identification.

Inclusion of a message created using an exchange key shared in advance between an authorized transmitter and a receiver in question in a verification request makes it possible to prevent an unauthorized device from acquiring a corresponding message of acceptance even if the unauthorized device transmits update information currently in use to the transmitter. Accordingly, it is possible to prevent the receiver from successful identification during reception of a fraudulently substituted content component from a masquerading device.

If a receiver cannot receive a message of acceptance, it stops utilizing received content. This makes it possible to prevent a fraudulently substituted content from an unauthorized and masquerading device from being made available to a user.

If a receiver cannot receive a message of acceptance, it stops utilizing received content after retries for a predetermined period or a predetermined number of retries. This makes it possible to prevent a content from being made available (viewable) while the receiver is permanently repeating a retry due to interference of an unauthorized device.

A receiver continues making a verification request even after stopping utilizing received content until the receiver succeeds in receiving a message of acceptance. This achieves the effect that when an unauthorized device finishes masquerading, reception can be immediately restarted.

As described above, use of the authorized content verification method, content transmission and reception system, transmitter, and receiver of the present invention makes it possible to prevent reception of a fraudulently substituted content component from an unauthorized and masquerading device.

Note that a program of the present invention is a program for causing a computer to execute the operations of all or some of the steps including the verification request step of, by the receiver, transmitting the authorization verification request, the update information check step of, by the transmitter, checking whether the update information is the predetermined update information, the message-of-acceptance transmission step of, by the transmitter, creating the message of acceptance and transmitting the message of acceptance to the receiver, and the authorized content determination step of, by the receiver, verifying that the transmitter is an authorized transmitter if the message of acceptance is received from the transmitter of the above-described authorized content verification method of the present invention and is a program which operates in cooperation with the computer.

A recording medium of the present invention is a recording medium having recorded thereon a program for causing a computer to execute all or part of each of the operations of all or some of the steps including the verification request step of, by the receiver, transmitting the authorization verification request, the update information check step of, by the transmitter, checking whether the update information is the predetermined update information, the message-of-acceptance transmission step of, by the transmitter, creating the message of acceptance and transmitting the message of acceptance to the receiver, and the authorized content determination step of, by the receiver, verifying that the transmitter is an authorized transmitter if the message of acceptance is received from the transmitter of the above-described authorized content verification method of the present invention and is a computer-readable recording medium, the program of which, when read, is used in cooperation with the computer.

The expression "some of the steps" of the present invention refers to one or more steps of the plurality of steps.

The expression "the operations of . . . the steps" of the present invention refers to all or part of each of the operations of the steps.

A usage form of the program of the present invention may be such that the program is recorded on a computer-readable recording medium and operates in cooperation with a computer.

Examples of a recording medium include a ROM.

The above-described computer of the present invention is not limited to pure hardware such as a CPU and may include firmware, an OS, and a peripheral.

As has been explained above, the configuration of the present invention may be implemented by software or hardware.

INDUSTRIAL APPLICABILITY

The authorized content verification method, content transmission and reception system, transmitter, receiver, and the like of the present invention are useful as content verification techniques for avoiding an attack such as an unauthorized device's monitoring communication between an authorized transmitter and receiver and sending unauthorized content to the receiver on a network.

The invention claimed is:

1. An authorized content verification method in a content transmission and reception system in which a transmitter on a network attaches update information to encrypted content, the update information required to create a content key used for content encryption and decryption, the verification method comprising:
   transmitting by the transmitter the update information with the encrypted content, in response to a content request from a receiver authorized by the transmitter to decrypt the encrypted content, the update information being changed by the transmitter at a predetermined timing after transmitting the update information to the authorized receiver;
   transmitting, from the authorized receiver to the transmitter, an authorization verification request including the update information received from the transmitter, a number which varies with each transmission of the authorization verification request, and an identification message created using i) an exchange key shared in advance between the transmitter and the authorized receiver, and ii) the update information transmitted from the transmitter;
   checking, by the transmitter whether i) the update information included in the authorization verification request received from the authorized receiver satisfies a predetermined condition with respect to the update information currently being used by the transmitter and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the update information being changed by the transmitter in accordance with elapsing of time;
   creating, by the transmitter,
      a message of acceptance using the update information and the number included in the authorization verification request, and transmitting the message of acceptance from the transmitter to the authorized receiver if it is determined that i) the update information received in the request and the update information currently being used by the transmitter satisfy the predetermined condition, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the message of acceptance indicating that the encrypted content is authorized by the transmitter; and
   determining, by the authorized receiver, that:
      the encrypted content received is authorized content if the receiver receives the message of acceptance from the transmitter, the receiver decrypting and reproducing the encrypted content.

2. The authorized content verification method according to claim 1, wherein
   in the message-of-acceptance transmission step, the transmitter transmits a message of non-acceptance to the receiver if it is determined that the update information received in the request and the update information currently being used by the transmitter do not match, and
   in the authorized content determination step, the receiver determines that the encrypted content being received is not authorized content and stops utilizing the encrypted content if the receiver receives the message of non-acceptance from the transmitter.

3. The authorized content verification method according to claim 1, further comprising
   a verification request retry transmission step of, by the receiver, repeatedly transmitting the authorization verification request for a predetermined period if the receiver cannot receive the message of acceptance in the authorized content determination step, wherein
   in the authorized content determination step, the receiver stops utilizing the received encrypted content if the receiver cannot receive the message of acceptance even after a lapse of the predetermined period.

4. The authorized content verification method according to claim 1, further comprising
a verification request retry transmission step of, by the receiver, repeatedly transmitting the authorization verification request a predetermined number of times if the receiver cannot receive the message of acceptance in the authorized content determination step, wherein
in the authorized content determination step, the receiver stops utilizing the received encrypted content if the receiver cannot receive the message of acceptance even after the predetermined number of times of transmission of the authorization verification request.

5. The authorized content verification method according to claim 2, further comprising
a verification request retransmission step of, by the receiver, repeatedly transmitting the authorization verification request after the receiver stops utilizing the received encrypted content in the authorized content determination step until a
predetermined number-of-times limit or predetermined time limit is reached or a predetermined stop condition is met, wherein
in the authorized content determination step, the receiver starts utilizing the received encrypted content if the receiver receives the message of acceptance after the receiver stops utilizing the received encrypted content.

6. A content transmission and reception system comprising:
a receiver which transmits a content request and a transmitter connected to the receiver over a network which attaches, to encrypted content, update information required to create a content key used for content encryption and decryption, the transmitter transmits the update information with the encrypted content, in response to a content request from the receiver authorized by the transmitter to decrypt the encrypted content, the update information being changed by the transmitter at a predetermined timing after transmitting the update information to the authorized receiver,
wherein the authorized receiver includes:
a verification request instrument which transmits to the transmitter, an authorization verification request including a number which varies with each transmission of the authorization verification request, and an identification message created using i) an exchange key shared in advance between the transmitter and the authorized receiver, and ii) the update information transmitted from the transmitter, and
a verification result check instrument which determines that the encrypted content being received is authorized content if a message of acceptance is received from the transmitter, the receiver utilizing the authorized encrypted content, and
the transmitter includes:
a verification request acceptance instrument which receives the authorization verification request transmitted from the authorized receiver,
an update information verification instrument which checks whether i) the update information included in the received authorization verification request satisfies a predetermined condition with respect to the update information currently being used by the transmitter, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the update information being changed by the transmitter in accordance with elapsing of time, and
a verification response instrument which creates the message of acceptance using the update information and the number included in the authorization verification request, and transmits the message of acceptance to the authorized receiver if it is determined that i) the update information received in the request and the update information currently being used by the transmitter satisfy the predetermined condition, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the message of acceptance indicating that the encrypted content is authorized by the transmitter.

7. A transmitter used in a content transmission and reception system, comprising:
a transmission unit on a network which attaches update information to encrypted content, the update information required to create a content key used for content encryption and decryption, the transmitter transmits the update information with the encrypted content, in response to a content request from a receiver authorized by the transmitter to decrypt the encrypted content, the update information being changed by the transmitter at a predetermined timing after transmitting the update information to the authorized receiver;
a verification request acceptance instrument which receives from the authorized receiver, an authorization verification request including a number which varies with each transmission of the authorization verification request, and an identification message created using i) an exchange key shared in advance between the transmitter and the authorized receiver, and ii) the update information transmitted from the transmitter;
an update information verification instrument which checks whether i) the update information included in the authorization verification request received from the authorized receiver satisfies a predetermined condition with respect to the update information currently being used by the transmitter, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the update information being changed by the transmitter in accordance with elapsing of time; and
a verification response instrument which creates a message of acceptance for determining whether the encrypted content being received by the authorized receiver is authorized content, using the update information and the number included in the authorization verification request, and transmitting the message of acceptance to the receiver if it is determined that i) the update information received in the request and the update information currently being used by the transmitter satisfy the predetermined condition, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the authorized receiver utilizing the authorized encrypted content.

8. A receiver used in a content transmission and reception system in which a transmitter on a network attaches update information to encrypted content, the update information required to create a content key used for content encryption and decryption, the transmitter transmits the update information with the encrypted content, in response to a content request from the receiver, the update information being changed by the transmitter at a predetermined timing after transmitting the update information to the receiver, the receiver being authorized by the transmitter to decrypt the encrypted content, the authorized receiver comprising:

a reception unit which receives the update information with the encrypted content;

a verification request instrument which transmits an authorization verification request including the update information received from the transmitter, a number which varies with each transmission of the authorization verification request, and an identification message created using i) an exchange key shared in advance between the transmitter and the authorized receiver, and ii) the update information transmitted from the transmitter; and a verification result check instrument which determines that the encrypted content being received is authorized content if a message of acceptance is received from the transmitter, which is created using the update information and exchange key and transmitted by the transmitter after determining that i) the update information included in the received authorization verification request and the update information currently being used by the transmitter satisfy a predetermined condition, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the update information being changed by the transmitter in accordance with elapsing of time, the receiver utilizing the authorized encrypted content, and if the predetermined condition is satisfied and the part of the hash value matches the identification message, the authorized receiver decrypts and reproduces the encrypted content.

9. A tangible non-transitory computer readable recording medium having a program recorded thereon for causing a computer to execute the following steps between a transmitter and a receiver authorized by the transmitter:

a transmit step of, transmitting by the transmitter update information with encrypted content, in response to a content request from the receiver;

a verification request step of, transmitting by the authorized receiver, an authorization verification request including the update information received from the transmitter, a number which varies with each transmission of the authorization verification request, and an identification message created using i) an exchange key shared in advance between the transmitter and the authorized receiver, and ii) the update information transmitted from the transmitter;

an update information check step of, checking by the transmitter, whether i) the update information included in the authorization verification request received from the authorized receiver satisfies a predetermined condition with respect to the update information currently being used by the transmitter and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver, the update information being changed by the transmitter in accordance with elapsing of time;

a message-of-acceptance transmission step of, creating by the transmitter, a message of acceptance using the update information and the number included in the authorization verification request, and transmitting the message of acceptance to the authorized receiver, if it is determined that the update information received in the request and the update information currently being used by the transmitter satisfy the predetermined condition, and ii) a part of a hash value which is calculated based on the update information included in the authorization verification request received from the authorized receiver, the number included in the authorization verification request received from the authorized receiver, and the exchange key matches the identification message included in the authorization verification request received from the authorized receiver; and an authorized content determination step of, determining by the authorized receiver, that the encrypted content being received is authorized content if the authorized receiver receives the message of acceptance from the transmitter, the receiver decrypting and reproducing the authorized encrypted content.

10. The authorized content verification method according to claim 3, further comprising a verification request retransmission step of, by the receiver, repeatedly transmitting the authorization verification request after the receiver stops utilizing the received encrypted content in the authorized content determination step until a predetermined number-of-times limit or predetermined time limit is reached or a predetermined stop condition is met, wherein in the authorized content determination step, the receiver starts utilizing the received encrypted content if the receiver receives the message of acceptance after the receiver stops utilizing the encrypted received content.

11. The authorized content verification method according to claim 4, further comprising a verification request retransmission step of, by the receiver, repeatedly transmitting the authorization verification request after the receiver stops utilizing the received encrypted content in the authorized content determination step until a predetermined number-of-times limit or predetermined time limit is reached or a predetermined stop condition is met, wherein in the authorized content determination step, the receiver starts utilizing the received encrypted content if the receiver receives the message of acceptance after the receiver stops utilizing the received encrypted content.

12. The authorized content verification method, according to claim 1, including:

creating by the transmitter, a message of non-acceptance using the update information and the exchange key shared in advance between the transmitter and the receiver, and transmitting the message of non-acceptance from the transmitter to the receiver if it is determined that the update information received in the request and the update information currently being used by the transmitter do not match, and determining by the receiver, that the encrypted content received is unauthorized content if the receiver receives the message of non-acceptance from the transmitter, the receiver discarding the unauthorized encrypted content.

* * * * *